United States Patent [19]

Mottus et al.

[11] Patent Number: 4,694,039

[45] Date of Patent: Sep. 15, 1987

[54] STABILIZED LACTAM POLYMERIZATION SOLUTIONS

[75] Inventors: Edward H. Mottus, Ballwin; Ross M. Hedrick; Bernard Silverman, both of St. Louis, all of Mo.

[73] Assignee: DSM Rim Nylon V.O.F., Geleen, Netherlands

[21] Appl. No.: 927,595

[22] Filed: Nov. 6, 1986

Related U.S. Application Data

[62] Division of Ser. No. 844,405, Mar. 26, 1986, Pat. No. 4,672,085.

[51] Int. Cl.$^4$ ................................................. C08K 5/21
[52] U.S. Cl. .................................... 524/718; 524/714; 524/720; 524/723; 524/728; 525/432
[58] Field of Search ............... 524/718, 720, 723, 714, 524/728; 525/432

[56] References Cited

U.S. PATENT DOCUMENTS

| | | | |
|---|---|---|---|
| 3,086,962 | 4/1961 | Mottus et al. | 528/315 |
| 3,190,763 | 12/1963 | Schleede et al. | 106/186 |
| 3,211,692 | 1/1963 | Hopkins et al. | 524/216 |
| 3,321,433 | 5/1967 | Baumann | 260/30.2 |
| 3,547,848 | 11/1967 | Marsh et al. | 260/404.5 |
| 3,622,534 | 11/1971 | Timmons et al. | 252/316 |
| 3,654,214 | 3/1972 | Beckman | 524/99 |
| 3,817,850 | 6/1974 | Feinberg | 522/32 |
| 3,925,306 | 12/1975 | Schlichting et al. | 524/222 |
| 3,935,161 | 1/1976 | Schlichting et al. | 524/212 |
| 4,094,687 | 3/1977 | Lawton | 106/21 |
| 4,111,703 | 3/1977 | Lawton | 106/21 |
| 4,157,336 | 1/1977 | Jordan | 526/50 |
| 4,168,260 | 1/1978 | Wiezer et al. | 544/180 |
| 4,240,954 | 12/1980 | Stretanski | 524/96 |
| 4,252,705 | 12/1980 | Brecker | 526/344 |
| 4,339,555 | 10/1980 | Ohmura et al. | 525/66 |
| 4,485,213 | 3/1983 | Matsuo et al. | 525/123 |
| 4,581,419 | 4/1986 | Gabbert et al. | 525/437 |

OTHER PUBLICATIONS

Mottus et al., Initiated Polymerization of Caprolactam: Molecular Weight Control, 1968, pp. 390-397, Polymer Preprints 9 (No. 1).
Hotten, Benzylureas As Antioxidants for Hydrocarbons, pp. 243-246, I & EC Product Research and Dev.
Derwent Abstract; 51-033188, 3/76, Japan.
Derwent Abstract; 631471, 8/82, Switzerland.
Derwent Abstract; 60-028431, 2/85, Japan.
Derwent Abstract; 52-057294, 5/77, Japan.
Derwent Abstract; 51-068697, 6/76, Japan.
Derwent Abstract; 51-060293, 5/76, Japan.
Derwent Abstract; 54-039493, 3/79, Japan.
Derwent Abstract; 135233, European Patent, 3/85.
Derwent Abstract; 58-119812, 7/83, Japan.
Derwent Abstract; 136846, 8/79, Ger. Dem. Rep.
Derwent Abstract; 60-040117, 3/85, Japan.

*Primary Examiner*—Lewis T. Jacobs
*Attorney, Agent, or Firm*—Cushman, Darby & Cushman

[57] ABSTRACT

Unsaturated oligomers and solutions thereof are stabilized with a trisubstituted urea to provide improved storage stability. The stabilized unsaturated oligomer solutions are useful in lactam polymerization processes which yield nylon block copolymers containing unsaturated oligomer segments. The unsaturated oligomers disclosed herein have at least 4 carbons and have pendant thereto at least one hydroxy, amine, epoxy, acyllactam, or acyllactam precursor group.

16 Claims, No Drawings

STABILIZED LACTAM POLYMERIZATION SOLUTIONS

This is a division of application Ser. No. 844,405, filed Mar. 26, 1986, now U.S. Pat. No. 4,672,085.

The present invention relates to unsaturated oligomers and solutions thereof for lactam polymerization to form nylon block copolymers and is more particularly related to such oligomers and solutions thereof containing trisubstituted urea stabilizers for improved storage stability.

Nylon block copolymers as herein referred to are polymers containing polyamide, or "hard", segments and "soft", elastomeric segments provided by an unsaturated hydrocarbon oligomer or polymer. The properties of the nylon block copolymer can be varied by varying the nature and amount of the hard and soft segments. Such block copolymers are useful in the manufacture of fibers, fabrics, films and molded articles.

Nylon block copolymers can be prepared by a number of different routes. One route, described in RE 30,371, issued to Hedrick and Gabbert, involves the condensation of a polyol and an imide in the presence of a suitable anionic catalyst to form an initiator having activated lactam terminal groups which are capable of initiating polymerization of a lactam monomer to yield a nylon block copolymer. A second route, described in Applicants' copending U.S. application, Ser. No. 467,626, now U.S. Pat. No. 4,581,419, issued Apr. 8, 1986 involves reacting a polyol with an acid halide and then capping the resulting product with lactam to yield a lactam-terminated initiator. Again the initiator is capable of initiating lactam polymerization to yield a nylon block copolymer. Additional routes are disclosed in U.S. Pat. No. 4,490,520, wherein initiators are formed from polyamines; French Publication No. 2322165, wherein initiators are formed from poly(carboxylic acids); and U.S. Pat. No. 4,400,490 wherein initiators are formed from epoxides.

It is often desirable to be able to store solutions containing the elastomer-providing oligomers or the initiators formed therefrom prior to reacting to form a nylon block copolymer. Such is particularly desirable for reactive fabrication systems, such as reaction injection molding (RIM), in which molten solutions of initiator in lactam monomer are stored at an elevated temperature prior to reaction. It has been found, however, that when these oligomers or initiators are unsaturated they tend to gel, especially when stored at an elevated temperature and/or in steel containers. It is, therefore, desirable to suppress gel formation and improve the storage stability of such oligomers and initiators.

The present invention is directed to a composition comprising an unsaturated oligomer and a stabilizing amount of a trisubstituted urea, wherein the unsaturated oligomer is formed from an alkadiene having at least 4 carbons and has pendant thereto at least one group, preferably at least two groups selected from the group consisting of hydroxy, amine, epoxy, acyllactam, and acyllactam precursor groups. Such oligomers are either capable of initiating lactam polymerization or are capable of being reacted in situ to form an oligomer capable of initiating lactam polymerization. Oligomers containing pendant hydroxy and epoxy groups are known in the art. For example, hydroxylated polybutadienes are available from ARCO Chemical Company, Philadephia, PA, under the tradename POLY BD ® Liquid Resins, and butadiene-acrylonitrile copolymers containing pendant epoxy groups are available from Dow Chemical Company, Midland, MI, under the tradename KELPOXY ® epoxy component. Oligomers containing pendant amine groups are also known in the art, for example, by the partial reduction of a butadiene-acrylonitrile copolymer in the presence of LiAlH$_4$.

The present invention further pertains to nylon block copolymers prepared from these stabilized oligomers and to the process of making such copolymers from these stabilized compositions.

The unsaturated oligomers useful for the practice of the present invention contain polyalkadiene or alkadiene copolymer segments. Particularly useful oligomers contain segments derived from conjugated dienes, such as polybutadienes, polyisoprenes, and butadiene-acrylonitrile copolymers. Suitable oligomers can comprise, in addition to the unsaturated segments, polyether segments such as polyalkylene ethers, polyester segments containing polyether segments, and polysiloxane segments such as poly(dimethylsiloxanes) and the like.

Advantageously the unsaturated oligomer has a number average molecular weight in the range of about 300 to about 20,000, preferably in the range of about 1000 to about 6000, and is selected to provide soft, elastomeric segments in the nylon block copolymer while the polylactam segments produced by the addition polymerization of the lactam monomer provide hard, crystalline segments. Soft segments contribute a glass transition temperature, $T_g$, of less than about 0° C., preferably less than about −25° C., when they are incorporated into a nylon block copolymer. The glass transition temperature is conveniently measured by differential scanning calorimetry under nitrogen at a scanning rate of 10° C. per minute.

Oligomers substituted with lactam groups are effective lactam polymerization initiators. Those initiators useful for the practice of the present invention are oligomers containing at least one, and preferably at least two acyllactam groups per oligomer molecule. Suitable acyllactam groups are of the formula:

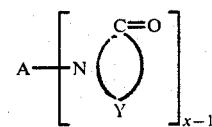

where A is attached to the backbone of the unsaturated oligomer and is a group selected from

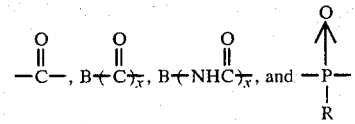

where B is a C$_1$ to C$_{30}$ hydrocarbyl radical, x is the valence of A and is in the range of 2 to 4, Y is a C$_3$ to C$_{11}$ alkylene group, R is hydrogen or a C$_1$ to C$_{10}$ hydrocarbyl radical. Preferred lactam groups are those wherein A is

B is a $C_4$ to $C_{10}$ hydrocarbyl radical, and Y is a $C_3$ or $C_5$ alkylene radical derived from ε-caprolactam or 2-pyrrolidinone. Especially preferred for fast polymerization initiation are those lactam groups in which B is meta- or para-phenylene. Suitable precursor groups are provided by groups such as acylhalides, isocyanates, ketenes, and the like which are rapidly converted in situ by reaction with lactam monomer to form acyllactam groups. Suitable lactam monomers are those containing a $C_3$ to $C_{11}$ alkylene group; preferred for fast lactam polymerization are those containing a $C_3$ or $C_5$ alkylene group.

A convenient method of attaching acyllactam or precursor acyl halide groups to oligomers containing hydroxy or amine groups is provided by reaction of polyacyl halides to form substituent groups represented by the formula:

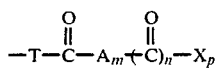

wherein T is oxygen or nitrogen; A is a hydrocarbyl or hydrocarbyl ether group; X is chlorine, bromine, or

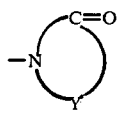

wherein Y is a $C_3$ to $C_{11}$ alkylene group; m is 0 or 1, when m is 0, n is 0 or 1 and p is 1, and when m is 1, n is in the range of 1 to 3 and p=n. When X is chlorine or bromine it may be further reacted with lactam monomer, preferably prior to exposure to lactam polymerization conditions, to form an acyllactam terminal group capable of acting as a lactam polymerization initiator.

Other suitable substituent groups are hydroxy, amine and epoxy groups, all of which are capable of being further reacted with a polyacyllactam, such as terephthaloyl- or isophthaloyl biscaprolactam, to form an oligomer having acyllactam substituent groups or they may be reacted with another oligomer having acyllactam substituent groups to provide a lactam polymerization initiator containing two or more oligomer segments which may be the same or different in nature. RE No. 30,371, issued to Hedrick and Gabbert, discloses in situ reaction of an oligomer having hydroxy substituent groups, i.e. a polyol, with a polyacyllactam, i.e. an imide, and is incorporated herein by reference. An oligomer containing either amine or epoxy substituent groups may be similarly reacted with a polyacyllactam to form a lactam polymerization initiator by heating the two reactants neat or in lactam monomer prior to exposure to lactam polymerization conditions. Example 3 of U.S. Pat. No. 4,490,520 discloses such a synthesis from polyamines and Example 1 of U.S. Pat. No. 4,400,490, from epoxys.

Other methods for forming unsaturated oligomers containing acyllactam initiator groups suitable for use in the present invention are disclosed in French Publication No. 2322165; British Pat. No. 1,067,153; and Applicant's copending application, Ser. No. 467,626, now U.S. Pat. No. 4,581,419.

Trisubstituted ureas useful for practicing the invention may be formed prior to adding to the unsaturated oligomers or oligomer solutions or may be formed in situ, when the oligomer substituent groups are not hydroxy or a primary or secondary amine, by reacting a secondary amine with an isocyanate compound.

Exemplary trisubstituted ureas and thioureas may be represented by the formula:

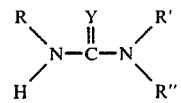

wherein Y is selected from the group consisting of oxygen and sulfur and wherein R, R', and R'' are monovalent $C_1$ to $C_{20}$ hydrocarbyl radicals free from reactive groups; R and R' together can be the divalent tetramethylene group; and R' and R'' together can be the divalent polymethylene group $(CH_2)_n$, wherein n is an integer from 2 to 5. The cyclic ureas can also have one or more of the hydrogen atoms of the polymethylene groups substituted by monovalent radicals free from reactive groups, as for example the hydrocarbyl radicals alkyl, cycloalkyl, aryl, aralkyl, and alkaryl radicals preferably containing less than about 10 carbon atoms. Illustrative examples of the R, R' and R'' radicals are the hydrocarbyl radicals such as alkyl, cycloalkyl, aryl, aralkyl and alkaryl, i.e. methyl, ethyl, propyl, isopropyl, n-butyl, sec-butyl, tert-butyl, isobutyl, amyl, isoamyl, hexyl, isohexyl, heptyl, octyl, 2-ethylhexyl, nonyl, decyl, undecyl, dodecyl, tridecyl, tetradecyl, hexadecyl, octadecyl, cyclopropyl, cyclobutyl, cyclopentyl, cyclohexyl, bicyclohexylyl, decahydronaphthyl, tetradecahydroanthyl, tetrahydroabietyl, phenyl, biphenylyl, naphthyl, anthryl, benzyl, phenethyl, benzhydryl, α-mesityl, tolyl, xylyl, mesityl, duryl, cumyl, and the like. In general, unsubstituted hydrocarbyl radicals are preferred. However, they can contain various substituents therein, which are inert in the instant reaction, for example, halogen atoms such as chloro- and bromo-substituted hydrocarbyl radicals, such as methoxy, ethoxy, propoxy, phenoxy, toloxy, and other modified hydrocarbon radicals containing the oxa or thia structure; tertiary amino radicals such as dimethylamino, diethylamino, ethylmethylamino, and the like; other modified hydrocarbyl radicals such as those containing silicon atoms, e.g. trimethylsilylmethyl, diphenylmethylsilylmethyl, p-chlorophenyldimethylsilylmethyl; and the like. When R and R', or R' and R'', together provide a cyclic urea the tetramethylene chain, or polymethylene chain, can also contain various inert substituents similar to the monovalent hydrocarbyl radicals.

Specific illustrative trisubstituted ureas suitable for use as stabilizers in the present invention are, for example: 1,3-diphenyl-3-methyl urea, trimethylurea, 1,1-dimethyl-3-phenylurea, 1,1-n-dibutyl-3-phenylurea, 1,1-dimethyl-3-(m-tolyl)urea, 1,1-diethyl-3-(p-ethylphenyl)urea, 1,1-dimethyl-3-(2-naphthyl)urea, 1,1-dimethyl-3-(2-biphenyl)urea, 1-ethyl-3-ethyl-3-phenylurea, 1,1-dimethyl-3-(p-chlorophenyl)urea, 1,1-diethyl-3-(p-chlorophenyl)urea, 1-methyl-1-ethyl-3-(p-chlorophenyl)urea, 1,1-diisopropyl-3-(o-chlorophenyl)urea, 1,1-di-n-octyl-3-(p-chlorophenyl)urea, 1,1-dicyclohexyl-3-(p-chlorophenyl)urea, 1,1-dimethyl-3-(3-chloro-4-tert.-butyl)urea, 1,1-dimethyl-3-(2,4-dichlorophenyl)urea, 1,1-diethyl-3-2,4,6-trichlorophenyl)urea, 1,1-dimethyl-3-(4-chloronaphthyl)urea, 1,1-dimethyl-3-(p-butoxyphenyl)urea, 1,1-dimethyl-3-(o-ethoxyphenyl)urea, 1,1-dimethyl-3-(p-methoxyphenyl)urea, 1-(β-diethylaminoethyl)3-mesitylurea, 1,1-pentamethylene-3- methylurea, 1,1-tetramethylene-3-methylurea, and the like. Preferred, based on its ability to stabilize the oligomers is 1,3-diphenyl-3-methylurea.

Similar trisubstituted thioureas to the above illustrative trisubstituted ureas can also be employed, such as: 1,3-diphenyl-3-methylthiourea, triphenyl thiourea, trimethylthiourea, tridodecylthiourea, 1-ethyl-1-cyclohexyl-3-phenylthiourea, 1-benzyl-1-n-butyl-3-xylylthiourea, and the like.

In addition to the above-mentioned ureas and thioureas, the polyureas and polythioureas can be employed as stabilizers, e.g. wherein two urea molecules of the above-described class of compounds are linked by R''', a divalent radical, free from reactive groups, i.e.:

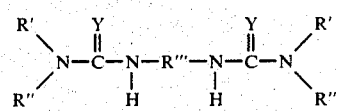

By the choice of the functionality of the components employed to make the polyurea it will be apparent that a large number of "urea" units can be present in the molecule as when a diamine is reacted with a diisocyanate or diisothiocyanate. However, the lower polyureas are generally preferred such as the class of diureas formed by the reaction of 1 mole of a difunctional compound, as for example, a diisocyanate or diisothiocyanate with a monoamine, or a diamine with a monoisocyanate or monoisothiocyanate. From the foregoing illustrative examples it will be apparent that the term "urea" when employed in the broad sense such as "trisubstituted urea stabilizer", is intended to embrace the disclosed class of trisubstituted ureas and thioureas and polyureas and polythioureas.

Illustrative examples of R''' are methylene, ethylene, propylene, butylene, pentylene, hexamethylene and higher analogs along with their branched analogs, phenylene, tolylene, xylylene, 1,4 diradical from diphenylmethane, 2,2-diphenyl propane and the like.

The secondary amines and isocyanates suitable for the preparation of the above-described trisubstituted ureas and thioureas and the corresponding polyureas and polythioureas may be substituted with $C_1$ to $C_{20}$ hydrocarbyl radicals free from reactive groups. Illustrative examples of suitable secondary amines are dimethylamine, diethylamine, diisopropyl amine, diphenylamine, N-methylaniline, and the like. Illustrative isocyanates are phenyl isocyanate, tolyl isocyanate and diisocyanate, hexamethylene diisocyanate, and the like.

The trisubstituted urea is provided in a stabilizing amount sufficient to increase the storage life of the composition when heated at 125° C. Advantageously from about 0.05 to about 10 wt. %, preferably from about 0.1 to about 5 wt. %, and more preferably from about 1 to about 2 wt. %, trisubstituted urea based on the weight of the oligomer is required.

The unsaturated oligomers of the invention are normally stored in lactam monomer. Lactam monomers useful for the practice of the invention contain from 3 to 11, preferably 3 or 5, alkylene groups. The weight ratio of oligomer to lactam monomer is from about 1:20 to about 1:1. Further, when the oligomer is a hydroxylated polyalkadiene or a hydroxylated alkadiene copolymer, it may be desirable to have present a polyacyllactam or an acid halide material capable of reacting to produce a lactam polymerization initiator capped with at least one lactam group. In accordance with the present invention, a stabilizing amount of trisubstituted urea, or a precursor thereof, is added to the oligomer in lactam monomer, normally from about 0.05 to about 10 wt. % based on the weight of the oligomer.

Optionally an antioxidant may be added to the oligomer composition to improve its stability further. The amount of antioxidant should be sufficient to prevent skin formation when heated under nitrogen at 125° C. for 72 hours; normally this amount is between about 0.05 and about 5 wt. % based on the weight of the oligomer. Illustrative examples of suitable antioxidants are substituted phenols, thiophenols, and phosphites. One antioxidant found particularly useful for the invention is polymerized 1,2-dihydro-2,2,4-trimethylquinoline available from Monsanto Company under the tradename FLECTOL ® H antioxidant.

Formation of a nylon block copolymer from the stabilized oligomer solution is preferably accomplished by a reactive fabrication process, such as RIM, but may be accomplished by conventional techniques known to those skilled in the art. In order to polymerize the lactam solution of unsaturated oligomer containing the trisubstituted urea stabilizer to form a nylon block copolymer containing unsaturated segments, a final reaction mixture containing effective concentrations of catalyst and initiator is prepared and allowed to react. The initiator can be provided by the oligomer and/or by the addition of low molecular weight polyacyllactams, such as iso- and terephthaloyl bis-caprolactam. Suitable lactam polymerization catalysts include lactam magnesium halides and alkali metal lactamates prepared in caprolactam solution by methods well known in the art.

For fast polymerization catalysis with acyllactam-terminated initiators lactam magnesium halide catalysts can be selected. Preferred lactam magnesium halides include caprolactam and 2-pyrrolidinone magnesium bromides. It may be convenient to form a first reaction composition containing unsaturated oligomer, trisubstituted urea stabilizer, optionally an antioxidant, and, when necessary, additional initiator in lactam monomer and a second reaction mixture containing lactam monomer and the caprolactam polymerization catalyst. Advantageously the concentrations are sufficient to provide substantially complete polymerization of the lactam to nylon block copolymer in less than about 15 minutes at a reaction temperature in the range of about 130° to about 180° C. Satisfactory rates are generally obtained with about 2 to about 20 meq, based on the average number of initiator groups per molecule, of initiator per mole of lactam monomer and with about 0.1 to about 20 mole percent catalyst per mole of lactam monomer.

EXAMPLES 1–17

The following examples are illustrative only and are not intended to indicate or limit the breadth of the invention. Each sample is prepared by placing 10 g of a acyllactam-terminated polybutadiene oligomer having a polybutadiene backbone and acyllactam initiator groups, formed from terephthaloyl or isophthaloyl bis-acyllactam and ARCO R-45HT polybutadiene diol, into a 25×150 mm test tube with the additional components for each indicated in the tables below. The tube is then flushed with nitrogen, stoppered lightly, and heated at 125° C. for 30 minutes; at which time, the tube is again flushed with nitrogen, stoppered tightly, and heated at 125° C. for the time indicated for each in Tables 1, 2 and 3 below. A carbon steel coupon, 1.3 cm×5.1 cm, is placed in the examples which are below-indicated as containing steel. The results are determined by visual inspection of the contents of the tubes and by inversion of the tubes following exposure and are listed in Tables 1, 2 and 3. When an inverted sample exhibits no detectable flow upon inversion of the tube, it is considered a "gel". Because gel time is dependent on the age and nature of, and impurities in, each oligomer lot, a control is run with each series of experiments.

EXAMPLES 1–5

Examples 2–5 are according to the invention and illustrate the improved storage stability of an alkadiene-containing oligomer with a trisubstituted urea is formed in situ from a secondary amine and an isocyanate when compared to that of Control Example 1 which does not contain either a secondary amine or an isocyanate and is not according to the invention. Examples 2–5 further illustrate the improvement when the percent stabilizer is increased from 1 wt. % to 2 wt. % based on the weight of the oligomer.

The data and results for Examples 1–5 are given in Table 1.

TABLE 1

| Example | N—methyl-aniline (ml) | Phenyliso-cyanate (ml) | Other | Time (hr.) | Results |
|---|---|---|---|---|---|
| 1 (Control) | 0.1 | — | — | 22 | very viscous |
|  |  |  |  | 46 | gel |
| 2 | 0.1 | 0.1 | — | 22 | fluid (skin)* |
|  |  |  |  | 46 | " |
| 3 | 0.1 | 0.1 | Steel | 22 | " |
|  |  |  |  | 46 | " |
| 4 | 0.05 | 0.05 | — | 22 | fluid |
|  |  |  |  | 46 | gel |
| 5 | 0.05 | 0.05 | Steel | 22 | fluid |
|  |  |  |  | 46 | gel |

*Indicates skin formation on top of the fluid

EXAMPLES 6–17

Examples 6–9 and 12–15 are according to the invention and illustrate storage stability of an alkadiene-containing oligomer containing a preformed trisubstituted urea when compared to that of Control Examples 10, 11, 16 and 17 which do not contain such a urea and are not according to the invention. Examples 12–15 illustrate the decreased skin formation after 3 hours exposure indicating further improved storage stability, when the trisubstituted urea-containing oligomer additionally contains 0.5 wt. %, based on the weight of the oligomer, FLECTOL ®H antioxidant when compared with Examples 6–9, which do not contain FLECTOL ®H.

The data and results for Examples 6–17 are given in Table 2.

TABLE 2

| Example | 1,3-diphenyl-1-methylurea (g) | Other | Time (hrs.) | Results |
|---|---|---|---|---|
| 6 (Control) | 0.1 | — | 3 | fluid (skin) |
|  |  |  | 24 | gel |
| 7 | 0.1 | Steel | 3 | fluid (skin) |
|  |  |  | 24 | gel |
| 8 | 0.2 | — | 3 | fluid |
|  |  |  | 24 | fluid (skin) |
| 9 | 0.2 | — | 3 | fluid |
|  |  |  | 24 | fluid (skin) |
| 10 (Control) | — | — | 3 | fluid (skin) |
|  |  |  | 24 | gel |
| 11 (Control) | — | Steel | 3 | fluid (skin) |
|  |  |  | 24 | gel |
| 12 | 0.1 | Flectol ®H, — | 3 | fluid |
|  |  |  | 24 | gel |
| 13 | 0.1 | Flectol ®H, Steel | 3 | fluid |
|  |  |  | 24 | fluid (skin) |
| 14 | 0.2 | Flectol ®H, — | 3 | fluid |
|  |  |  | 24 | fluid (skin) |
| 15 | 0.2 | Flectol ®H, Steel | 3 | fluid |
|  |  |  | 24 | fluid (skin) |
| 16 (Control) | — | Flectol ®H, — | 3 | fluid |
|  |  |  | 24 | gel |
| 17 (Control) | — | Flectol ®H, Steel | 3 | fluid |
|  |  |  | 24 | gel |

*At 48 hours, all samples had gelled.

EXAMPLES 18–21

Examples 18 and 20 are according to the invention and illustrate the improved storage stability achieved when a trisubstituted urea is added to 6 g of the above-described oligomer in 4 g ε-caprolactam when compared to Control Examples 19 and 21 which are not according to the invention and do not contain such a stabilizer. The samples were treated in the same manner as previously described for Examples 1–17.

The data and results for Examples 18–21 are given in Table 3.

TABLE 3

| Example | 1,3-diphenyl-1-methylurea (g) | Other | Time (hrs.) | Results |
|---|---|---|---|---|
| 18 | 0.06 | — | 72 | fluid |
|  |  |  | 96 | fluid |
| 19 (Control) | — | — | 72 | fluid (skin) |
|  |  |  | 96 | gel |
| 20 | 0.06 | Steel | 72 | fluid (skin) |
|  |  |  | 96 | gel |
| 21 (Control) | — | Steel | 72 | gel |
|  |  |  | 96 | gel |

EXAMPLES 22–24

EXAMPLES 22–24 illustrate the improved stability which is obtained when from 0 to 2 wt. % trisubstituted urea is added to an oligomer containing hydroxy substituent groups, i.e., a polybutadiene diol, and the oligomer is then heated at 125° C. for 20 hours in air.

The data and results are given in Table 4.

TABLE 4

| Example | 1,3-diphenyl-1-methylurea (%) | Results |
|---|---|---|
| 22 | 0 | skin |
| 23 | 1 | fluid (slight skin) |
| 24 | 2 | fluid |

We claim:
1. A composition comprising:
   a lactam monomer; and
   an unsaturated oligomer and a stabilizing amount of a trisubstituted urea, wherein the unsaturated oligomer is a polymer of an alkadiene having at least 4 carbons and has pendant thereto at least one group selected from the group consisting of hydroxy, amine, epoxy, acyllactam, and acyllactam precursor groups.
2. The composition of claim 1 wherein the substituent groups are hydroxy.

3. The composition of claim 2 additionally comprising a polyacyllactam.

4. The composition of claim 1 additionally comprising an antioxidant in sufficient quantity to prevent skin formation when heated under nitrogen at 125° C. for 72 hours.

5. The composition of claim 1 wherein the weight ratio of oligomer to lactam monomer is from about 1:20 to about 1:1.

6. The composition of claim 2 wherein the weight ratio of oligomer to lactam monomer is from about 1:20 to about 1:1.

7. A nylon block copolymer formed by reacting the composition of claim 1 in the presence of a basic lactam polymerization catalyst.

8. The composition of claim 1 wherein the pendant groups are represented by the following formulae:

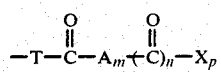

wherein T is oxygen or nitrogen; A is a hydrocarbyl or hydrocarbyl ether group; X is chlorine, bromine or

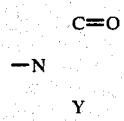

wherein Y is a $C_3$ to $C_{11}$ alkylene group; m is 0 or 1, when m is 0, n is 0 or 1, and p is 1, and when m is 1, n is in the range of 1 to 3 and p=n.

9. The composition of claim 1, wherein the amount of trisubstituted urea is from about 0.05 to about 10 wt.% based on the weight of the oligomer.

10. The composition of claim 1 wherein the pendant groups of the unsaturated oligomer are acyllactam groups.

11. The composition of claim 8 wherein X is

12. The composition of claim 1 wherein the pendant groups are acyllactam groups and wherein the trisubstituted urea is formed in situ by the reaction of a secondary amine and an isocyanate compound.

13. The composition of claim 11, wherein the average number of pendant groups per oligomer molecule is at least 2.

14. The composition of claim 11 wherein Y is —CH$_2$)$_3$ or (CH$_2$)$_5$.

15. The composition of claim 1 wherein there is from about 0.1 to about 5 wt. % trisubstituted urea based on the weight of the oligomer.

16. The composition of claim 1 additionally comprising a polyacyllactam.

* * * * *